United States Patent
Brandt et al.

(10) Patent No.: US 10,005,585 B2
(45) Date of Patent: Jun. 26, 2018

(54) WOODEN PALLET WITH NAIL PLATES AND RELATED METHODS

(75) Inventors: Ken Brandt, Orlando, FL (US); Dan Lantz, Orlando, FL (US)

(73) Assignee: CHEP Technology Pty Limited, Sydney (AU)

( * ) Notice: Subject to any disclaimer, the term of this patent is extended or adjusted under 35 U.S.C. 154(b) by 15 days.

(21) Appl. No.: 12/962,107

(22) Filed: Dec. 7, 2010

(65) Prior Publication Data

US 2011/0132237 A1 Jun. 9, 2011

Related U.S. Application Data

(60) Provisional application No. 61/267,664, filed on Dec. 8, 2009.

(51) Int. Cl.
*B65D 19/00* (2006.01)
*F16B 15/00* (2006.01)

(52) U.S. Cl.
CPC ........... *B65D 19/0095* (2013.01); *B65D 2519/00029* (2013.01); *B65D 2519/00064* (2013.01); *B65D 2519/00099* (2013.01); *B65D 2519/00129* (2013.01); *B65D 2519/00273* (2013.01); *B65D 2519/00293* (2013.01);
(Continued)

(58) Field of Classification Search
CPC ........... B65D 2519/00273; B65D 2519/00318; B65D 2519/00368; B65D 2519/00373
USPC ............. 16/4, 5; 52/712; 206/386, 595, 596, 206/598, 599, 600; 108/51.11, 56.1, 56, 108/3, 57.17, 57.33; 411/466, 461
See application file for complete search history.

(56) References Cited

U.S. PATENT DOCUMENTS 1,373,036 A 3/1921 Upson
2,621,006 A * 12/1952 Norrefeldt et al. ........ 108/57.17
(Continued)

FOREIGN PATENT DOCUMENTS

AU 9746751 * 11/1996
DE 2650181 * 8/1977
(Continued)

OTHER PUBLICATIONS

McKeever et al. "*Wood Used in Pallets Manufactured in the United States, 1982*" U.S. Dept. of Agriculter. Resource Buletin FPL-RB-17.

*Primary Examiner* — Janet M Wilkens
(74) *Attorney, Agent, or Firm* — Allen, Dyer, Doppelt and Gilchrist, P.A.

(57) ABSTRACT

A wooden pallet includes a base layer, and a cargo layer. The cargo layer includes a pair of spaced apart connector boards, and a pair of spaced apart end deck boards orthogonal to the pair of connector boards. Respective ends of the pair of end deck boards overlap respective ends of the pair of connector boards. Nail plates are coupled between the respective ends of the pair of connector boards and the respective ends of the pair of end deck boards. Each nail plate has a first surface having projections extending outwards therefrom and embedded into one of the end deck boards, and a second surface opposite the first surface devoid of any projections and contacting an end of one of the connector boards. Spaced apart support blocks are between the base layer and the pair of connector boards in the cargo layer, and form a gap therebetween for receiving a lifting member.

21 Claims, 6 Drawing Sheets

(52) U.S. Cl.
CPC .............. *B65D 2519/00298* (2013.01); *B65D 2519/00323* (2013.01); *B65D 2519/00333* (2013.01); *B65D 2519/00373* (2013.01); *B65D 2519/00437* (2013.01); *B65D 2519/00442* (2013.01); *B65D 2519/00572* (2013.01); *F16B 15/0046* (2013.01); *Y10T 29/49833* (2015.01)

(56) References Cited

U.S. PATENT DOCUMENTS

| | | | | |
|---|---|---|---|---|
| 2,675,767 | A * | 4/1954 | Eklund | 105/375 |
| 2,843,232 | A * | 7/1958 | Goldberg | 52/211 |
| 3,207,096 | A * | 9/1965 | Munroe | 108/51.11 |
| 3,322,018 | A * | 5/1967 | Moehlenpah et al. | 411/466 |
| 3,472,182 | A * | 10/1969 | Eklund | 108/57.17 |
| 3,494,645 | A * | 2/1970 | Jureit | 411/466 |
| 4,157,676 | A | 6/1979 | Jureit | 85/13 |
| 4,220,099 | A | 9/1980 | Marchesano | 108/51.1 |
| 4,235,148 | A * | 11/1980 | Menge | 411/466 |
| 4,738,204 | A | 4/1988 | Hammarberg | 108/51.1 |
| 5,725,087 | A | 3/1998 | Ives | 52/92.2 |
| 5,735,087 | A | 4/1998 | Olden | |
| 5,833,421 | A | 11/1998 | Lees et al. | |
| 6,003,448 | A | 12/1999 | Skuse | 108/51.11 |
| 6,584,915 | B1 | 7/2003 | Rogers | 108/56.1 |
| 7,056,074 | B2 | 6/2006 | Bas | 411/160 |
| 7,251,918 | B2 | 8/2007 | Reif et al. | 52/714 |
| 7,516,705 | B2 | 4/2009 | Hedstrom | 108/56.3 |
| 2002/0174621 | A1 * | 11/2002 | Melland | 52/712 |
| 2004/0237463 | A1 | 12/2004 | Reif et al. | |
| 2005/0229819 | A1 * | 10/2005 | Hollander et al. | 108/51.3 |
| 2008/0028998 | A1 * | 2/2008 | Hedstrom | 108/52.1 |
| 2008/0156234 | A1 * | 7/2008 | van de Camp | 108/51.11 |
| 2011/0258828 | A1 * | 10/2011 | Moss et al. | 29/428 |

FOREIGN PATENT DOCUMENTS

| | | |
|---|---|---|
| JP | 3890073 | 3/2007 |
| WO | 98/10880 | 3/1998 |

* cited by examiner

WOODEN PALLET WITH NAIL PLATES AND RELATED METHODS

RELATED APPLICATION

This application claims the benefit of U.S. Provisional Application Ser. No. 61/267,664 filed Dec. 8, 2009, the entire contents of which are incorporated herein by reference.

FIELD OF THE INVENTION

The present invention relates to the field of pallets, and more particularly, to a wooden pallet having an improved resilience to impacts from material handling equipment, and to related methods for making the same.

BACKGROUND OF THE INVENTION

Conventional wood pallets include a base layer and a cargo layer separated therefrom by support blocks. Traditionally, the base and cargo layers respectively have end deck boards assembled on connector boards that run the full length or width of the pallet. The end deck boards are nailed through the connector boards into the support blocks to build the primary structure of the pallet. The end deck boards are also known as lead boards, and the connector boards are also known as stringer boards.

To move the wooden pallets with cargo thereon, forklift tines are inserted into the gaps between the base and cargo layers. If the forklift is not stopped in time, the forklift crashes into one of the end deck boards of the pallet. Impacts such as this weaken the pallet and greatly shorten the lifespan of the pallet, thereby causing the pallet to be repaired more frequently and/or removed from service before its anticipated life cycle has been reached.

In an effort to improve pallet durability, nail plates have been used to strengthen wood pallet joints. U.S. Pat. No. 7,056,074 to Bas discloses nail plates between an upper surface of the support blocks and boards in the cargo layer, and between a lower surface of the support blocks and boards in the base layer. Each nail plate includes projections extending from upper and lower surfaces thereof, and a center opening for receiving a connecting device. A respective connecting device is used for each support block to couple the corresponding boards in the cargo and base layers to each support block, with the corresponding nail plates penetrating into opposing wood surfaces.

Similarly, U.S. Pat. No. 6,584,915 to Rogers discloses nail plates to strengthen wood pallet joints. The nail plates are between the end deck boards and the support blocks, wherein the projections from the nail plates are embedded into the support blocks. In particular, the projections for each nail plate are grouped into two bands to leave a central or median region that is void of any projections. Nails are driven through the central or median region of the nail plates.

Yet a further use of nail plates is disclosed in U.S. Pat. No. 7,516,705 to Hedstrom. The '705 patent is assigned to the current assignee of the present invention, and is hereby incorporated by reference in its entirety. The nail plates are between the connector boards and the support blocks, wherein the projections from the nail plates are embedded into the connector boards.

Even in view of the above noted nail plates, there is still a need to further improve the resiliency of a wooden pallet to impacts from material handling equipment.

SUMMARY OF THE INVENTION

In view of the foregoing background, it is therefore an object of the present invention to provide a wooden pallet that is resilient to impacts from material handling equipment.

This and other objects, advantages and features in accordance with the present invention are provided by a wooden pallet comprising a base layer, and a cargo layer. The cargo layer may comprise a pair of spaced apart connector boards, and a pair of spaced apart end deck boards orthogonal to the pair of connector boards. Respective ends of the pair of end deck boards may overlap respective ends of the pair of connector boards. Nail plates may be coupled between the respective ends of the pair of connector boards and the respective ends of the pair of end deck boards. Each nail plate may have a first surface that includes projections extending outwards therefrom and embedded into the end of one of the end deck boards, and a second surface opposite the first surface devoid of any projections and contacting the end of one of the connector boards. Spaced apart support blocks may be between the base layer and the pair of connector boards in the cargo layer, and form a gap therebetween for receiving a lifting member.

The cargo layer may further comprise a plurality of spaced apart intermediate deck boards between the pair of end deck boards and coupled to the pair of connector boards, with a gap area being defined between an inside edge of each end deck board and an adjacent one of the intermediate deck boards. Each nail plate may comprise a backstop extending within the gap area and contacting the inside edge of one of the end deck boards to absorb an impact to an outside edge thereof.

The backstop may be triangular shaped with an open interior. An upper corner of the inside edge of each end deck board may be notched, and wherein an upper tip of the backstop may be angled into the notch. The upper tip may be substantially coplaner with an upper surface of the end deck board.

Each nail plate may be stamped from a single metal sheet. The plurality of projections may comprise rounded tips. The plurality of projections may be arranged in rows and columns. The rows and columns may be in a zig-zag pattern.

The pallet may further comprise a plurality of fasteners coupling the pair of end deck boards and the pair of connector boards to the plurality of support blocks.

The base layer may comprise a pair of spaced apart end deck boards and a pair of spaced apart connector boards orthogonal to the pair of end deck boards. The pair of end deck boards and the pair of connector boards may be non-overlapping. The pallet may further comprise a plurality of nail plates coupled between respective ends of the pair of end deck boards and the plurality of support blocks. Each nail plate may have a first surface comprising a plurality of projections extending outwards therefrom and embedded into one of the end deck boards, and a second surface opposite the first surface and devoid of any projections, and contacting a support block.

The wooden pallet may also comprise a plurality of nail plates coupled between respective ends of the pair of connector boards and the plurality of support blocks. Each nail plate may have a first surface comprising a plurality of projections extending therefrom and embedded into one of the connector boards, and a second surface opposite the first surface and devoid of any projections, and contacting a support block.

Another aspect of the wooden pallet is directed to the nail plates, wherein each nail plate may have a length corresponding to a length of an end deck board. This simplifies the manufacturing process.

Yet another aspect is directed to a method for making a wooden pallet, as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternative embodiments.

Referring initially to FIGS. 1-4, a pallet 10 comprises a base layer 20, a cargo layer 30 and a plurality of support blocks 40. The support blocks 40 are coupled between the base and cargo layers 20, 30 and define a space 50 therebetween for receiving the lifting members of material handling equipment, such as fork lift tines from a forklift.

The cargo layer 30 comprises a pair of spaced apart top connector boards 32, and a pair of spaced apart top end deck boards 34 orthogonal to the top connector boards so that the cargo layer has a rectangular shape. The top connector boards 32 are also known as stringer boards, and run the full length of the pallet 10. The ends of the top connector boards 32 are between the support blocks 40 and the top end deck boards 34. In other words, top connector boards 32 and the top end deck boards 34 are non-coplanar. The cargo layer 30 further comprises spaced apart intermediate top deck boards 36 coupled to the top connector boards 32. The intermediate top deck boards 36 are substantially parallel to the top end deck boards 34.

The base layer 20 comprises a pair of spaced apart bottom end deck boards 24, and a pair of spaced apart bottom connector boards 22 orthogonal to the bottom end deck boards so that the base layer also has a rectangular shape. The bottom connector boards 22 are coplanar with the bottom end deck boards 24. In other words, the bottom end deck boards 24 contact the support blocks 40, and the bottom connector boards 22 contact the support blocks 40.

Figure 1:
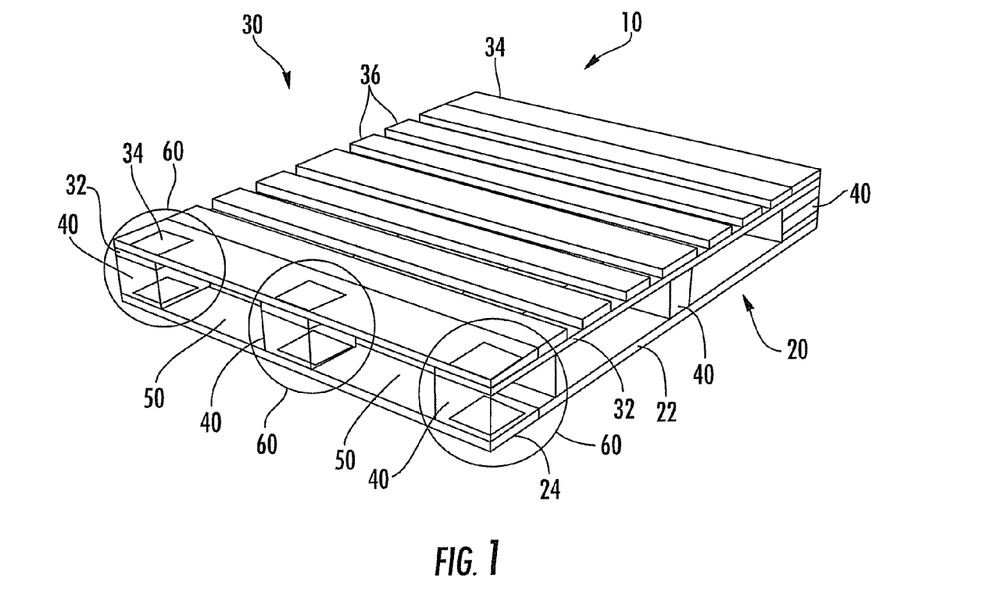
FIG. 1 is a top perspective view of a pallet with highlighted fragmentary sections illustrating nail plates in accordance with the present invention.

In particular, nail plates 50, 52 are used in the base and cargo layers 20, 30 to increase the resiliency of the pallet 10, as highlighted by the fragmentary sections 60 in FIG. 1. In addition, a fragmentary partial view of the pallet 10 is provided in FIG. 2.

Figure 2:
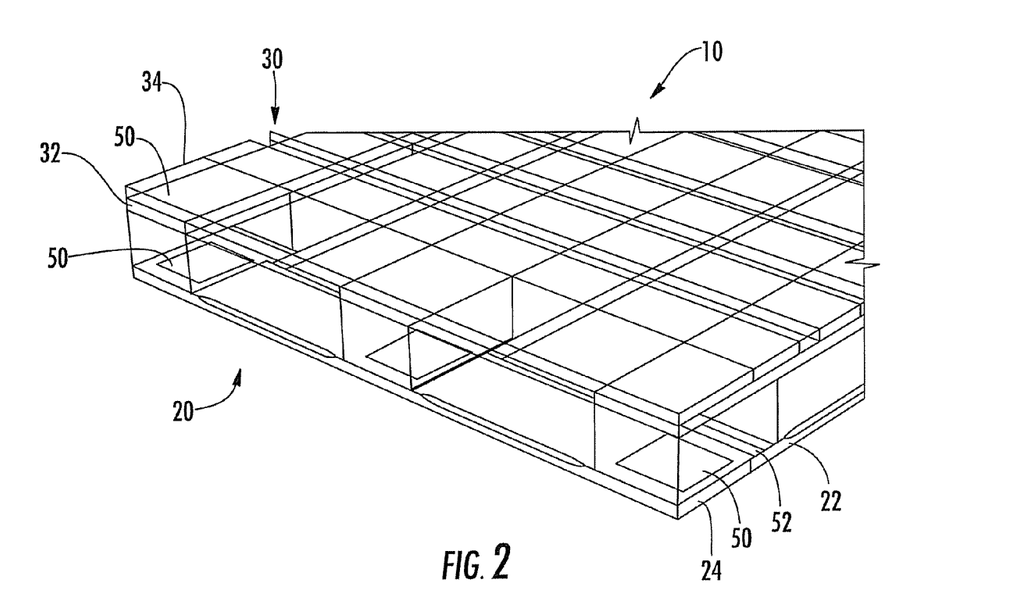
FIG. 2 is a partial fragmentary view of the pallet shown in FIG. 1.

In the cargo layer 30, the nail plates 50 are between the top end deck boards 34 and the top connector boards 32. In the base layer 20, the nail plates 50 are between the bottom end deck boards 24 and the support blocks 40, and the nail plates 52 are between the bottom connector boards 22 and the support blocks 40. As readily appreciated by those skilled in the art, the nail plates 50 in the cargo layer 30 may be used without the nail plates 50, 52 in the base layer 20, and vice-versa.

Figure 3:
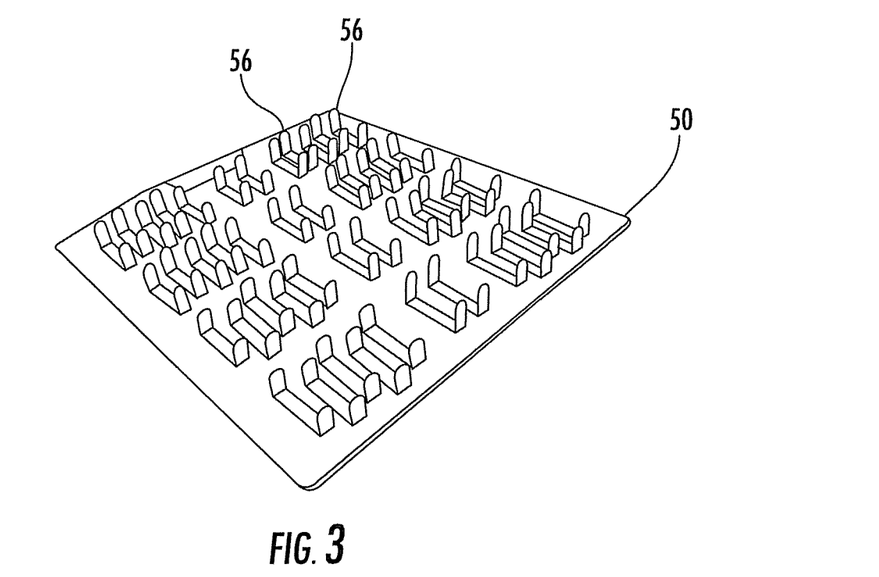
FIG. 3 is a top perspective view of a nail plate in accordance with the present invention.

As best illustrated in FIG. 3, each nail plate 50 is formed from a metal sheet, wherein flanges are punched in the metal sheet so that they form projections 56. The nail plate 50 may be stamped from a single metal sheet. The projections 56 extend outwards at right angles from the metal sheet. The projections 56 are on one side of the metal sheet. The other side of the metal sheet is flat and is void of any projections 56. This allows the nail plates 50, 52 to be applied to their respective boards prior to assembly of the pallet 10.

In the illustrated embodiment, the nail plate 50 is about 100 millimeters by 100 millimeters (i.e., about 4×4 inches). The nail plate 52 is smaller in size since it covers a limited area. In the illustrated embodiment, the nail plate 52 is about 25 millimeters by 100 millimeters (i.e., 1×4 inches). The size of the nail plates 50, 52 can vary depending on the intended application, as readily appreciated by those skilled in the art.

The metal sheet used for forming the nail plates 50, 52 has a thickness within a range of about 1 to 5 millimeters, for example. The thickness of the nail plates 50, 52 does not prevent nails 60 or other fastening devices from penetrating therethrough. A length of the projections 56 is within a range of about 5 to 15 millimeters, for example.

The tips of the projections 56 from the nail plates 50, 52 are curved/rounded. This advantageously reduces the risk of injury should the pallet 10 become damaged to the point where the projections from the nail plates are exposed as a result of missing wood. The projections 56 in the illustrated nail plate 50 are in a zig-zag pattern. As readily appreciated by those skilled in the art, the projections are not limited to a zig-zag pattern. For example, the projections may be lined up in rows, arcs and/or columns that may be evenly spaced as well non-evenly spaced.

Figure 4:
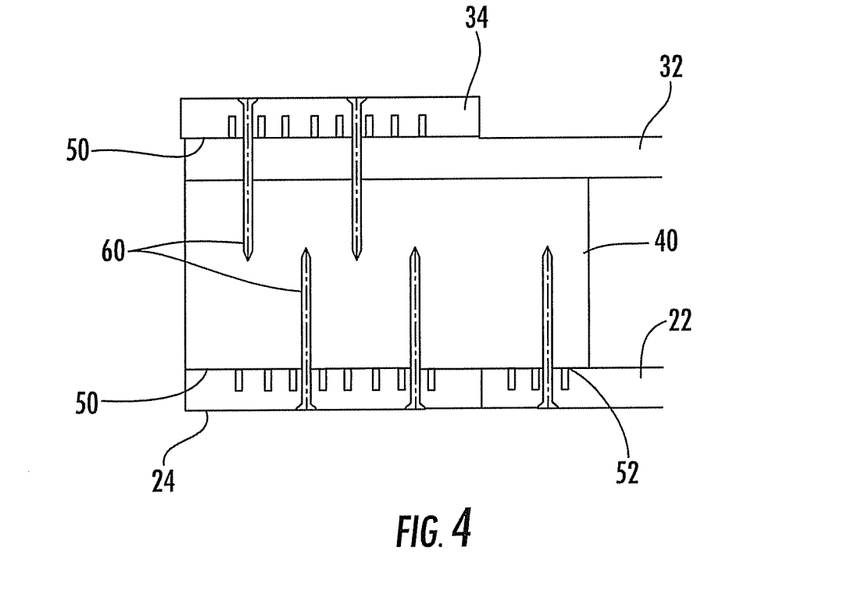
FIG. 4 is a side view of one of the highlighted fragmentary sections shown in FIG. 1.

Referring now to FIG. 4, the projections 56 from the nail plates 50, 52 are embedded into the top end deck boards 34, the bottom end deck boards 24, and the bottom connector boards 22. In contrast, the flat side of the respective nail plates 50, 52 are not embedded into the wood surfaces in contact therewith. This particular configuration of the nail plates 50, 52 as well as their placement advantageously distribute loads evenly so as to prevent splits in the boards, which in turn leads to wood being chipped or split away over time. The nail plates 50, 52 also help to reduce raised nails, pallet deflection and aging. Moreover, the nail plates 50, 52 help pallets maintain original dimensions and squareness as well as providing an improved shear resistance and bending performance of boards.

Figure 5:
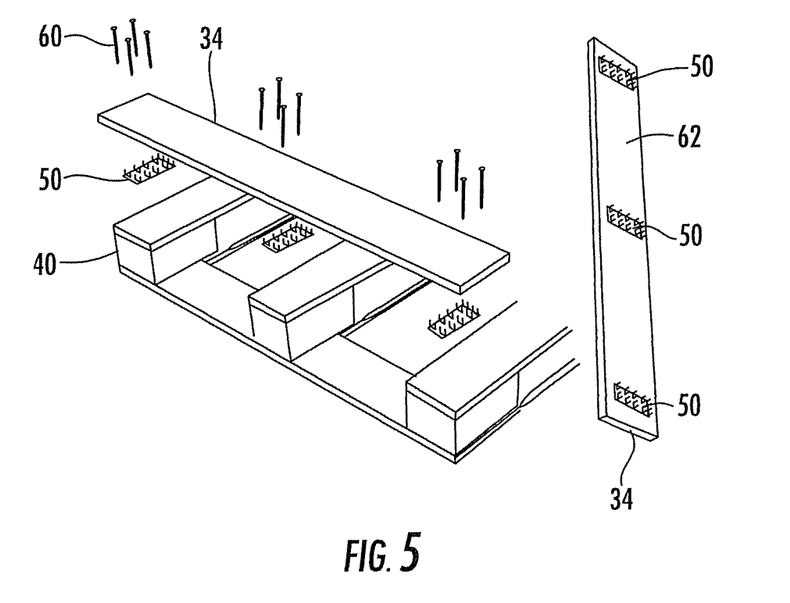
FIG. 5 is a partial exploded perspective view of a pallet with nail plates on the ends and in the middle of the top end deck board in accordance with the present invention.
Figure 6:
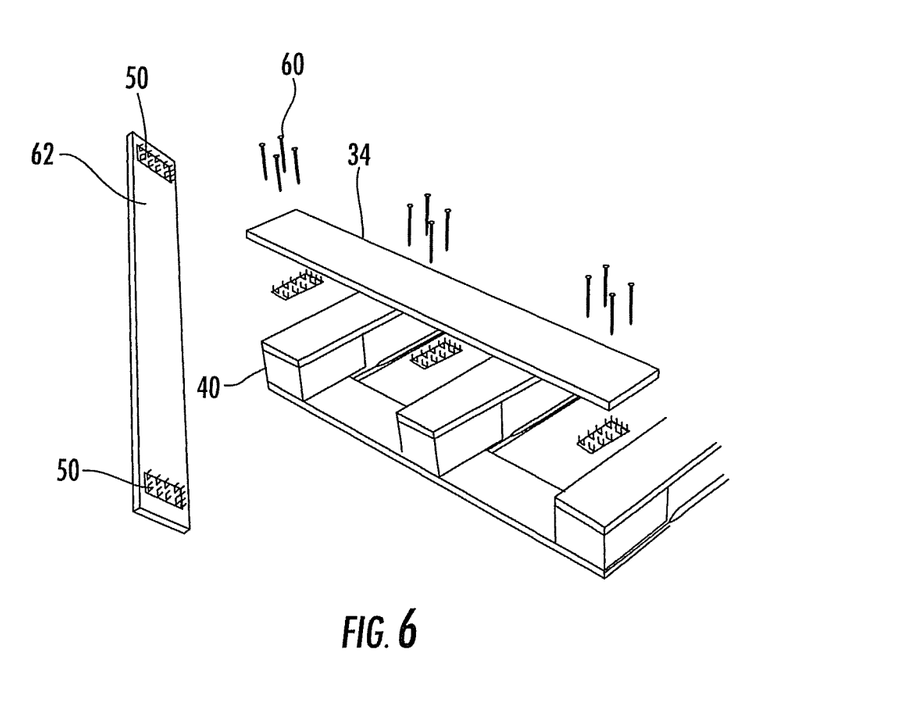
FIG. 6 is a partial exploded perspective view of a pallet with nail plates only on the ends of the top end deck board in accordance with the present invention.

As illustrated in FIG. 5, the nail plates 50 in the cargo layer 30 are positioned over the outer and inner support blocks 40. The bottom surface 62 of the top end deck board 34 illustrates placement of the three nail plates 50. Alternatively, the nail plate 50 over the center support block 40 may be omitted, as illustrated in FIG. 6.

Figure 7:
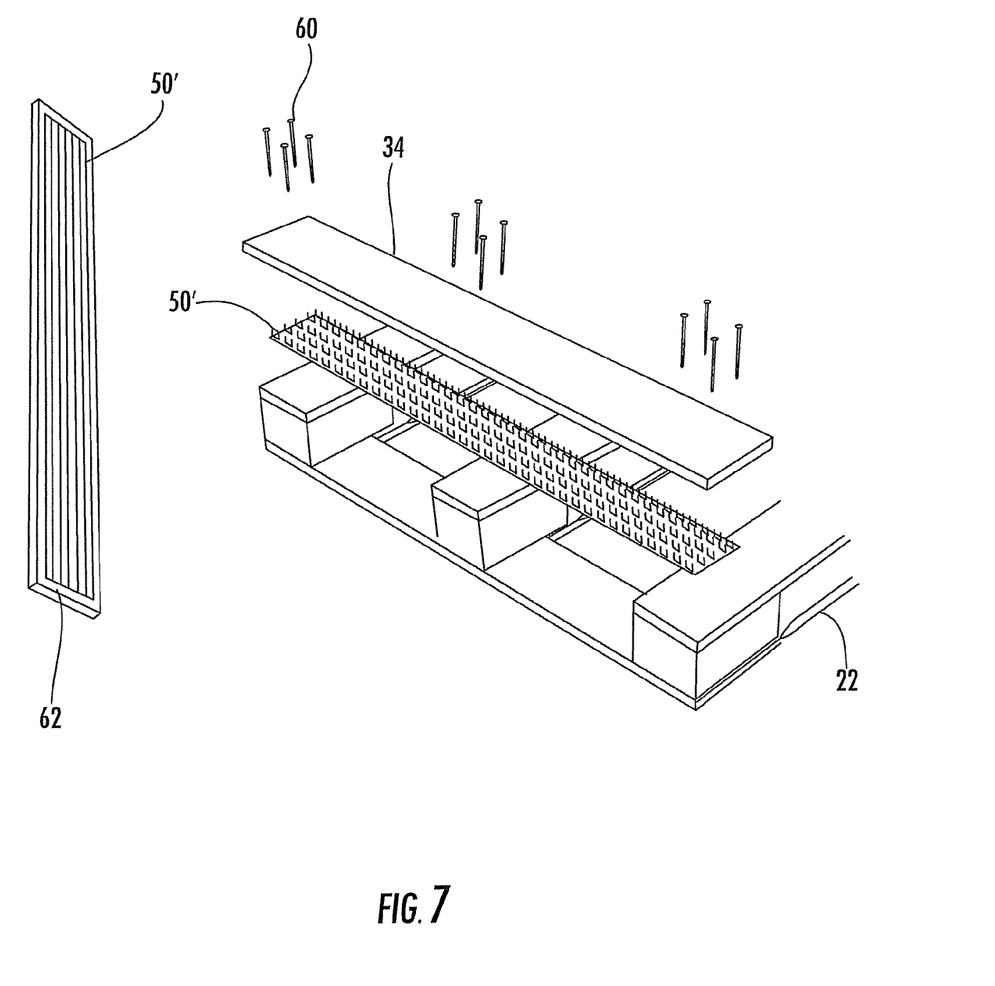
FIG. 7 is a partial exploded perspective view of a pallet with a single nail plate that extends the length of the top end deck board in accordance with the present invention.

In a different embodiment, the nail plate 50' is one piece so that it substantially extends the length of the top end deck boards 34, as illustrated in FIG. 7. The same positioning and configuration of the nail plate 50' in the cargo layer 30 is also applicable in the base layer 20. However, the nail plates 52 embedded into the bottom connector boards 22 remains as individual items.

To further increase the resiliency of the pallet 10, higher density wood may be chosen to form the top and bottom end deck boards 34 and 24, as well as the bottom connector boards 22. By combining the use of higher density wood with the nail plates 50 and 52, the pallets 10 are further able to withstand impacts over a longer period of time. This also results in an improved shear resistance and bending performance for loaded boards/pallets.

In other words, the strength and durability of the pallet 10 increases as the wood density increases. One category of wood density is "dense softwood" that generally includes wood having a density within a range of about 500 to 650 kg/m$^3$. This type of wood includes Southern Yellow Pine, for example. Another category of wood density is "dense hardwood" that generally includes wood having a density within a range of about 650 to 800 kg/m$^3$. This type of wood includes oak, beech, ash, maple, cherry, teak, gum and mahogany, for example.

As readily appreciated by those skilled in the art, both wood density and elimination of split initiation (because of the nail plates 50, 52) are critical to reducing damage in top end deck boards 34 and the bottom end deck boards 24. This results in decreased missing wood for increased customer satisfaction.

Figure 8:
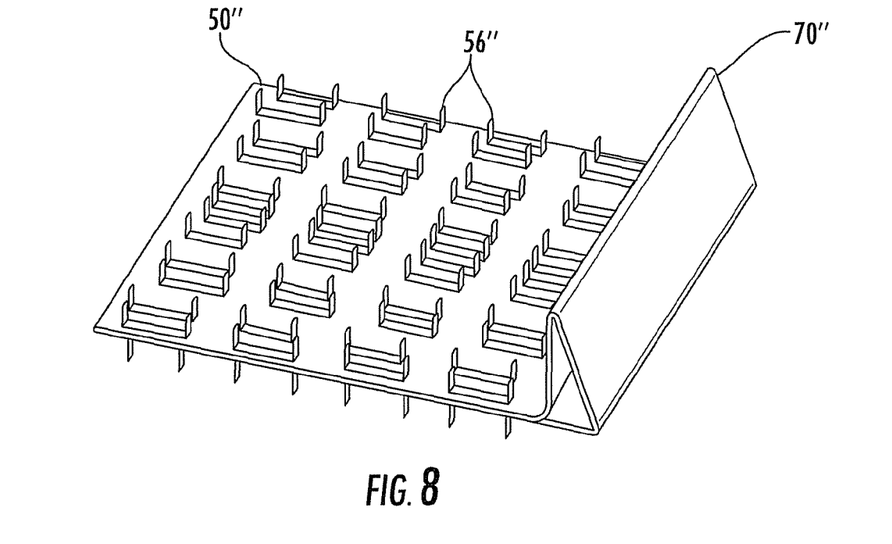
FIG. 8 is a top perspective view of a nail plate with a backstop in accordance with the present invention.
Figure 9:
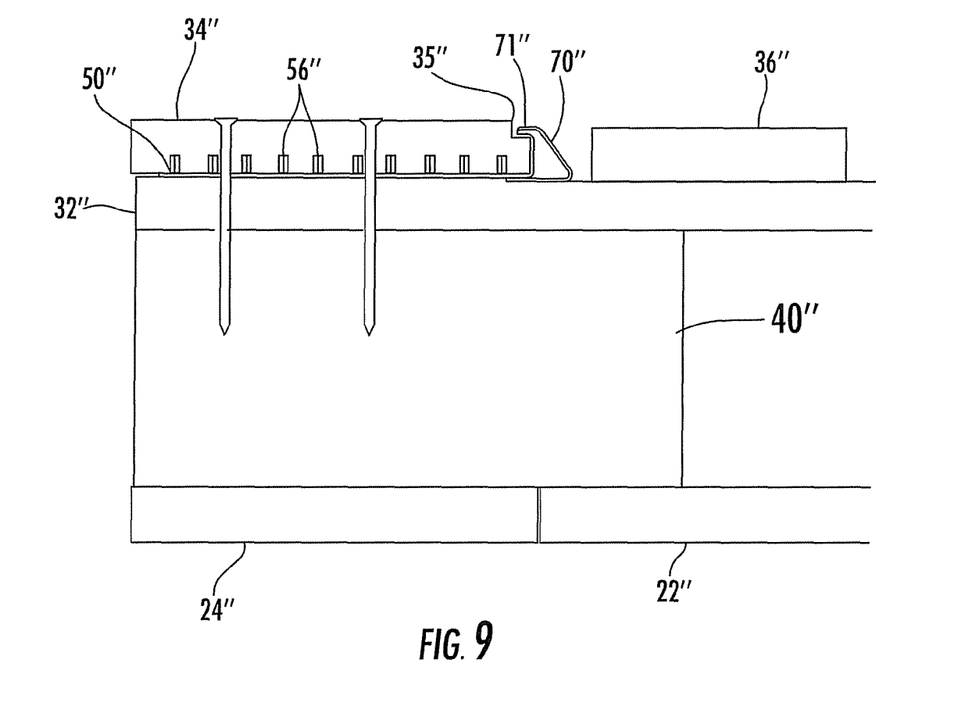
FIG. 9 is a partial side view of a pallet illustrating the nail plate with a backstop as shown in FIG. 8.

Another embodiment of the nail plate 50" will now be discussed in reference to FIGS. 8 and 9. This configuration nail plate 50" is referred to as a nail plate with a backstop 70". The backstop 70" extends within a gap area defined between an inside edge of each end deck board 34" and an adjacent one of the intermediate deck boards 36". The backstop 70" contacts the inside edge of one of the end deck boards 34" to absorb an impact to an outside edge of the same top end deck board 34".

When an impact force is applied to the outside edge of the top end deck board 34", the force is transmitted to the backstop 70" of the nail plate 50" so that the energy of the impact is dissipated over the length of the top end deck board 34. The nail plate 50" with the backstop 70" may extend the full length of a top end deck board 34" (as in FIG. 7), or may be in sections contacting just then respective ends of the top end deck boards 34" (as in FIG. 6).

The illustrated backstop 70' is triangular shaped with an open interior. However, the backstop 70' may have over shapes as readily appreciated by those skilled in the art. Each nail plate 50" and backstop 70" may be stamped from a single metal sheet.

In addition, an upper corner 35" of the inside edge of each end deck board 34' may be notched, and an upper tip 71' of the backstop 70" may be angled into the notch to provide an additional area to absorb an impact on the outside edge of the same top end deck board 34". The upper tip 71" is substantially coplaner with an upper surface of the end deck board 34". The nail plate 50" and backstop 70" may be stamped from a single metal sheet.

In the illustrated nail plate 50", the projections 56" project both upwards and downwards. Alternatively, the projections 56" may project only upwards, or may project only downwards.

Figure 10:
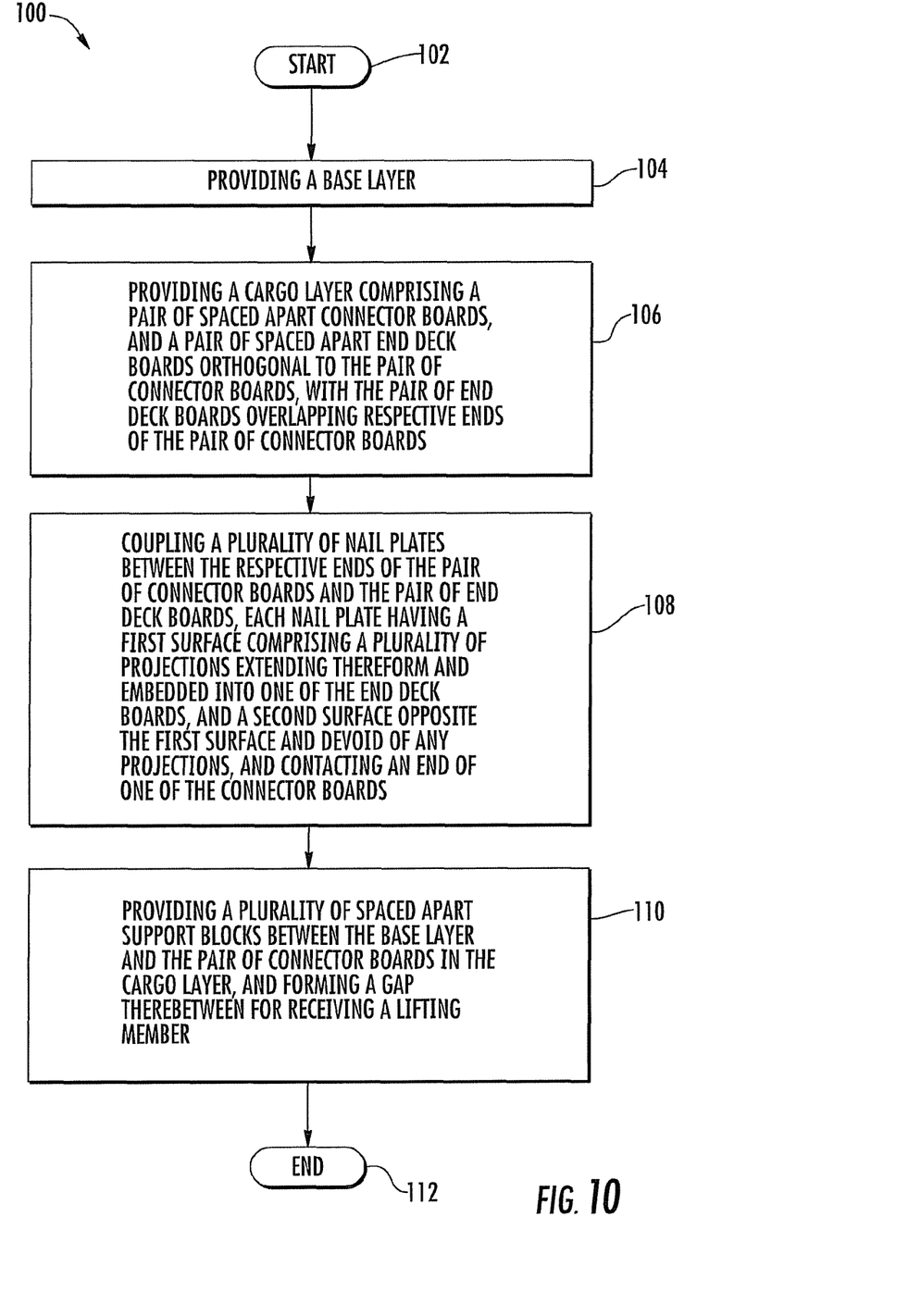
FIG. 10 is a flowchart illustrating a method for making a pallet in accordance with the present invention.

Another aspect is directed to a method for making a pallet 10 as described above. Referring now to the flowchart 100 illustrated in FIG. 10, from the start (Block 102), the method comprises providing a base layer 20 at Block 104, and providing a cargo layer 30 at Block 106. The cargo layer 30 comprises a pair of spaced apart connector boards 32, and a pair of spaced apart end deck boards 34 orthogonal to the pair of connector boards. The pair of end deck boards 34 overlap respective ends of the pair of connector boards 32. At Block 108, a plurality of nail plates 50 is coupled between the respective ends of the pair of connector boards 32 and the pair of end deck boards 34. Each nail plate 50 has a first surface comprising a plurality of projections 56 extending therefrom and embedded into one of the end deck boards 34, and a second surface opposite the first surface and devoid of any projections, and contacting an end of one of the connector boards 32. A plurality of spaced apart support blocks 40 is provided at Block 110 between the base layer 20 and the pair of connector boards 32 in the cargo layer 30, and forming a gap therebetween for receiving a lifting member. The method ends at Block 112.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A wooden pallet comprising:
    a base layer;
    a cargo layer comprising
        a pair of spaced apart wooden connector boards,
        a pair of spaced apart wooden end deck boards orthogonal to said pair of wooden connector boards, with respective ends of said pair of wooden end deck boards overlapping respective ends of said pair of wooden connector boards, and
        a plurality of spaced apart wooden intermediate deck boards between said pair of wooden end deck boards and coupled to said pair of wooden connector boards, with a gap area between an inside edge of each wooden end deck board and an adjacent inside edge of one of said wooden intermediate deck boards;
    a plurality of spaced apart wooden support blocks between said cargo layer and said base layer and forming a space gap therebetween for receiving a lifting member; and
    a plurality of nail plates coupled between the respective ends of said pair of wooden connector boards and the respective ends of said pair of wooden end deck boards in said cargo layer, each nail plate comprising
        a first surface comprising a plurality of projections extending outwards therefrom and embedded into the end of one of said wooden end deck boards,
        a second surface opposite the first surface and contacting the end of one of said wooden connector boards, and a backstop extending within the gap area between the inside edge of each wooden end deck board and an adjacent inside edge of one of said wooden intermediate deck boards, with said backstop having an edge that is parallel to and contacting the inside edge of one of said wooden end deck boards to absorb an impact to an outside edge thereof.

2. The wooden pallet according to claim 1 wherein each backstop is triangular shaped with an open interior.

3. The wooden pallet according to claim 2 wherein an upper corner of the inside edge of each wooden end deck board is notched; and wherein an upper tip of each backstop is angled into the notch.

4. The wooden pallet according to claim 3 wherein an upper surface of each backstop angled into the notch is substantially coplaner with an upper surface of an adjacent wooden end deck board.

5. The wooden pallet according to claim 1 where said base layer comprises a pair of spaced apart wooden connector boards, and a pair of spaced apart wooden end deck boards orthogonal to said pair of wooden connector boards, with respective ends of said pair of wooden end deck boards adjacent to and non-overlapping respective ends of said pair of wooden connector boards.

6. The wooden pallet according to claim 5 further comprising a respective nail plate in said base layer between each end of said pair of wooden connector boards and a respective one of said plurality of support blocks, while being devoid of a respective nail plate between each end of said pair of wooden end deck boards and the respective ones of said plurality of support blocks so that each end of said pair of wooden end deck boards is in direct contact with a respective support block, with each respective nail plate comprising
   a first surface comprising a plurality of projections extending outwards therefrom and embedded into the end of one of said wooden connector boards, and
   a second surface opposite the first surface and devoid of any projections, and contacting said support block.

7. The wooden pallet according to claim 6 further comprising a plurality of fasteners coupling said pair of spaced apart wooden connector boards and said pair of spaced apart wooden end deck boards on said base layer to said plurality of support blocks, with at least a portion of said plurality of fasteners penetrating through said nail plates.

8. The wooden pallet according to claim 1 wherein said plurality of projections comprise rounded tips.

9. The wooden pallet according to claim 1 wherein each nail plate is stamped from a single metal sheet.

10. The wooden pallet according to claim 1 wherein the second surface of each nail plate is devoid of any projections.

11. The wooden pallet according to claim 1 further comprising a plurality of fasteners coupling said pair of spaced apart wooden connector boards and said pair of spaced apart wooden end deck boards in said cargo layer to said plurality of support blocks, with at least a portion of said plurality of fasteners penetrating through said nail plates.

12. A method for making a wooden pallet comprising:
   providing a base layer;
   providing a cargo layer comprising
      a pair of spaced apart wooden connector boards,
      a pair of spaced apart wooden end deck boards orthogonal to the pair of wooden connector boards, with respective ends of the pair of wooden end deck boards overlapping respective ends of the pair of wooden connector boards, and
      a plurality of spaced apart wooden intermediate deck boards between the pair of wooden end deck boards and coupled to the pair of wooden connector boards, with a gap area between an inside edge of each wooden end deck board and an adjacent inside edge of one of the wooden intermediate deck boards;
   positioning a plurality of spaced apart wooden support blocks between the cargo layer and the base layer and forming a space therebetween for receiving a lifting member; and
   positioning a plurality of nail plates coupled between the respective ends of the pair of wooden connector boards and the respective ends of the pair of wooden end deck boards in the cargo layer, each nail plate comprising
      a first surface comprising a plurality of projections extending outwards therefrom and embedded into the end of one of the wooden end deck boards,
      a second surface opposite the first surface and contacting the end of one of the wooden connector boards, and
      a backstop extending within the gap area between the inside edge of each wooden end deck board and an adjacent inside edge of one of the wooden intermediate deck boards, with the backstop having an edge that is parallel to and contacting the inside edge of one of the wooden end deck boards to absorb an impact to an outside edge thereof.

13. The method according to claim 12 wherein each backstop is triangular shaped with an open interior.

14. The method according to claim 13 wherein an upper corner of the inside edge of each wooden end deck board is notched; and wherein an upper tip of each backstop is angled into the notch.

15. The method according to claim 14 wherein an upper surface of each backstop angled into the notch is substantially coplanar with an upper surface of an adjacent wooden end deck board.

16. The method according to claim 12 where said base layer comprises a pair of spaced apart wooden connector boards, and a pair of spaced apart wooden end deck boards orthogonal to said pair of wooden connector boards, with respective ends of said pair of wooden end deck boards adjacent to and non-overlapping respective ends of said pair of wooden connector boards.

17. The method according to claim 16 further comprising positioning a respective nail plate in the base layer between each end of the pair of wooden connector boards and a respective one of the plurality of support blocks, while being devoid of a respective nail plate between each end of the pair of wooden end deck boards and the respective ones of the plurality of support blocks so that each end of the pair of wooden end deck boards is in direct contact with a respective support block, with each respective nail plate comprising
   a first surface comprising a plurality of projections extending outwards therefrom and embedded into the end of one of the wooden connector boards, and
   a second surface opposite the first surface and devoid of any projections, and contacting the support block.

18. The method according to claim 17 further comprising a plurality of fasteners coupling said pair of spaced apart wooden connector boards and said pair of spaced apart wooden end deck boards on said base layer to said plurality of support blocks, with at least a portion of said plurality of fasteners penetrating through said nail plates.

19. The method according to claim 12 wherein said plurality of projections comprise rounded tips, and wherein each nail plate is stamped from a single metal sheet.

20. The method according to claim 12 wherein the second surface of each nail plate is devoid of any projections.

21. The method according to claim 12 further comprising a plurality of fasteners coupling said pair of spaced apart wooden connector boards and said pair of spaced apart wooden end deck boards in said cargo layer to said plurality of support blocks, with at least a portion of said plurality of fasteners penetrating through said nail plates.

* * * * *